United States Patent
Blazer et al.

(10) Patent No.: US 11,000,867 B2
(45) Date of Patent: May 11, 2021

(54) METHOD OF APPLYING POWDER TO A SUBSTRATE DURING A CONTINUOUS PROCESS

(71) Applicant: Corning Optical Communications LLC, Charlotte, NC (US)

(72) Inventors: Bradley Jerome Blazer, Granite Falls, NC (US); Craig Miller Conrad, Hickory, NC (US); Ming Li, Englewood, CO (US); Warren Welborn McAlpine, Hickory, NC (US)

(73) Assignee: Corning Optical Communications LLC, Charlotte, NC (US)

( * ) Notice: Subject to any disclaimer, the term of this patent is extended or adjusted under 35 U.S.C. 154(b) by 11 days.

(21) Appl. No.: 16/549,525

(22) Filed: Aug. 23, 2019

(65) Prior Publication Data

US 2019/0374964 A1 Dec. 12, 2019

Related U.S. Application Data

(62) Division of application No. 15/338,572, filed on Oct. 31, 2016, now Pat. No. 10,427,177.

(Continued)

(51) Int. Cl.
*B05B 7/14* (2006.01)
*B05C 19/04* (2006.01)
(Continued)

(52) U.S. Cl.
CPC ............ *B05B 7/1468* (2013.01); *B05B 14/48* (2018.02); *B05B 16/40* (2018.02); *B05B 16/90* (2018.02);
(Continued)

(58) Field of Classification Search
CPC ....... B05B 5/16; B05B 5/1683; B05B 7/1468; B05B 14/48; B05B 16/40; B05B 16/90;
(Continued)

(56) References Cited

U.S. PATENT DOCUMENTS 3,361,111 A 1/1968 Strobel et al.
3,436,244 A 4/1969 Yokawonis
(Continued)

FOREIGN PATENT DOCUMENTS

CA 1128746 A1 8/1982
CN 104289336 A 1/2015
(Continued)

OTHER PUBLICATIONS

Global Dossier Translation of CN201680080433 Office Action dated Jun. 1, 2020; 21 Pages; Chinese Patent Office.
(Continued)

*Primary Examiner* — Carl J Arbes
(74) *Attorney, Agent, or Firm* — William D. Doyle

(57) ABSTRACT

A recirculating powder applicator includes an applicator body having an inlet on an upstream surface and an outlet on a downstream surface, wherein the inlet and outlet define a passage that extends transversely through the thickness of the applicator body, a powder conduit, an air inlet, an exhaust aperture located on one of the upstream or downstream surfaces, and a circulation chamber located on the interior of the applicator body. The powder conduit and air inlet are in fluid communication with the passage and the passage is in fluid communication with the circulation chamber. A method of applying powder to a substrate during a continuous process includes using a recirculating powder applicator.

12 Claims, 8 Drawing Sheets

Related U.S. Application Data

(60) Provisional application No. 62/260,896, filed on Nov. 30, 2015.

(51) Int. Cl.
  *H01B 13/14* (2006.01)
  *D07B 7/14* (2006.01)
  *D06B 1/16* (2006.01)
  *B05B 14/48* (2018.01)
  *B05B 16/40* (2018.01)
  *B05B 16/00* (2018.01)
  *B05D 1/12* (2006.01)
  *B21C 23/30* (2006.01)
  *G02B 6/44* (2006.01)
  *B05C 11/02* (2006.01)

(52) U.S. Cl.
  CPC ............... *B05C 19/04* (2013.01); *B05D 1/12* (2013.01); *B21C 23/30* (2013.01); *D06B 1/16* (2013.01); *D07B 7/14* (2013.01); *G02B 6/4486* (2013.01); *G02B 6/4494* (2013.01); *H01B 13/14* (2013.01); *B05C 11/021* (2013.01)

(58) Field of Classification Search
  CPC ....... E21B 19/00; E21B 33/02; B05C 11/021; B05C 19/04; B05D 1/12; B21C 23/30; D06B 1/18; D07B 7/14; G02B 6/4486; G02B 6/4494; H01B 13/14
  See application file for complete search history.

(56) References Cited

U.S. PATENT DOCUMENTS

| | | | |
|---|---|---|---|
| 4,100,002 A | 7/1978 | Woytiuk et al. | |
| 4,688,518 A | 8/1987 | Missier | |
| 4,808,432 A | 2/1989 | Hajek | |
| 4,812,086 A | 3/1989 | Kopemicky | |
| 5,018,910 A | 5/1991 | Weiss | |
| 5,213,271 A | 5/1993 | Uribe et al. | |
| 5,388,175 A | 2/1995 | Clarke | |
| 5,773,097 A | 6/1998 | Rogari | |
| 5,794,847 A | 8/1998 | Stocker | |
| 6,240,873 B1 | 6/2001 | Bertellotti et al. | |
| 6,338,440 B1 | 1/2002 | Horner | |
| 6,354,465 B2 | 3/2002 | Bell et al. | |
| 7,323,057 B2 | 1/2008 | Fleury | |
| 7,793,869 B2 | 9/2010 | Mather et al. | |
| 2010/0055456 A1 | 3/2010 | Perera et al. | |
| 2011/0286705 A1 | 11/2011 | Blazer et al. | |

FOREIGN PATENT DOCUMENTS

| | | | |
|---|---|---|---|
| DE | 4224886 A1 | 2/1994 | |
| EP | 256558 A1 | 2/1988 | |
| EP | 528613 B1 | 5/1997 | |
| EP | 1777070 A2 | 4/2007 | |
| GB | 1501696 A | 2/1978 | |
| WO | 2010/105173 A2 | * 9/2010 | |
| WO | 2010/105173 A3 | * 9/2010 | |

OTHER PUBLICATIONS

International Search Report and Written Opinion PCT/US2016/057601 dated Feb. 21, 2017.

Rolf Schlicht GmbH, RS Powdertech Electrostatic powder coating, "http://www.schlicht-gmbh.de/tl_files/schlicht-universal/content/rs_produkte/powdertech/RSC%20Prospekt-E.pdf".

EP16871228.9 Office Action and Search Report dated Jul. 2, 2019, European Patent Office, 9 pgs.

* cited by examiner

METHOD OF APPLYING POWDER TO A SUBSTRATE DURING A CONTINUOUS PROCESS

CROSS-REFERENCE TO RELATED APPLICATIONS

This application is a divisional of U.S. patent application Ser. No. 15/338,572, filed Oct. 31, 2016, which claims the benefit of priority under 35 U.S.C. § 119 to U.S. Provisional Application No. 62/260,896, filed Nov. 30, 2015, and is incorporated herein by reference.

BACKGROUND

The disclosure relates generally to a powder applicator and more particularly to a powder applicator for a continuous process line. Various types of powder can be applied to products for a variety of reasons, such as to provide lubrication, to absorb moisture, and to color a surface. Often the object to which the powder is applied is produced on a continuous process line. Because powders are a collection of unconnected particles, powders can be difficult to control, especially when dispersed in the air. Additionally, powders tend to clump when exposed to moisture. Machinery for the application of powders often tends to be messy and inefficient (i.e., much of the powder is wasted during application) at applying powders to the substrate. Further, in a continuous process, clumps in the powder can disrupt the process line either by clogging the powder applicator or by creating a jam in downstream machinery.

SUMMARY

One embodiment of the disclosure relates to a recirculating powder applicator, having an applicator body including an inlet on an upstream surface and an outlet on a downstream surface, wherein the inlet and outlet define a passage that extends transversely through the thickness of the applicator body; a powder conduit; an air inlet; an exhaust aperture located on one of the upstream or downstream surfaces; and a circulation chamber located on the interior of the applicator body. The powder conduit and air inlet are in fluid communication with the passage and the passage is in fluid communication with the circulation chamber.

An additional embodiment of the disclosure relates to a method of applying powder to a substrate during a continuous process, the method comprising the steps of providing a continuous run of a substrate through a powder applicator; providing a metered flow of powder onto the substrate through a powder conduit of the powder applicator, wherein a first portion of the powder is deposited on the substrate from the powder conduit; providing between 15 and 100 psi of air through an air inlet of the powder applicator simultaneously with the depositing step, wherein and the air recirculates a second portion of the powder within a circulation chamber of the powder applicator and wherein the second portion of powder is deposited on the substrate after being recirculated; and exhausting the air through an exhaust aperture located within the circulation chamber of the powder applicator, wherein the exhausted gas contains less than 5% of the powder dispersed within the air.

An additional embodiment of the disclosure relates to a method of applying a moisture barrier between a cable core and an armor, the method comprising the steps of receiving a run of cable core from a cable core payoff; receiving a run of armor from an armor payoff; forming the armor at least partially around the cable core during a first armor forming step; applying a superabsorbent powder to the cable core and an interior surface of the partially formed armor, wherein the powder is applied using a powder applicator that includes an applicator body including an inlet on an upstream surface and an outlet on a downstream surface, wherein the inlet and outlet define a passage that extends transversely through the thickness of the applicator body; a powder conduit; an air inlet; an exhaust aperture located on one of the upstream or downstream surfaces; and a circulation chamber located on the interior of the applicator body and including a depression formed around the exhaust aperture. The powder conduit and air inlet are in fluid communication with the passage and \the passage is in fluid communication with the circulation chamber. The forming of the armor around the cable core may then be completed during a second armor forming step such that the armor surrounds the cable core.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Referring generally to the figures, various embodiments of a recirculating powder applicator are shown. In one embodiment, the recirculating powder applicator is designed to apply a superabsorbent polymer (SAP) powder to the surface of an optical fiber cable core in order to provide a moisture barrier. For an optical cable, in particular, if moisture reaches the individual optical fiber strands, then the optical fiber can experience stress corrosion cracking caused by the reaction of water with silica at locations of strained bonding, such as at surface defects. Therefore, preventing moisture from reaching the optical fiber surface is an important factor in extending the life of an optical cable. While the following discussion will be framed in terms of the application of SAP powder to an optical fiber cable core, those skilled in the art will recognize from the following description that such embodiments are provided by way of example only, not by way of limitation, and that all alternative embodiments and applications are reserved herein.

Figure 1:
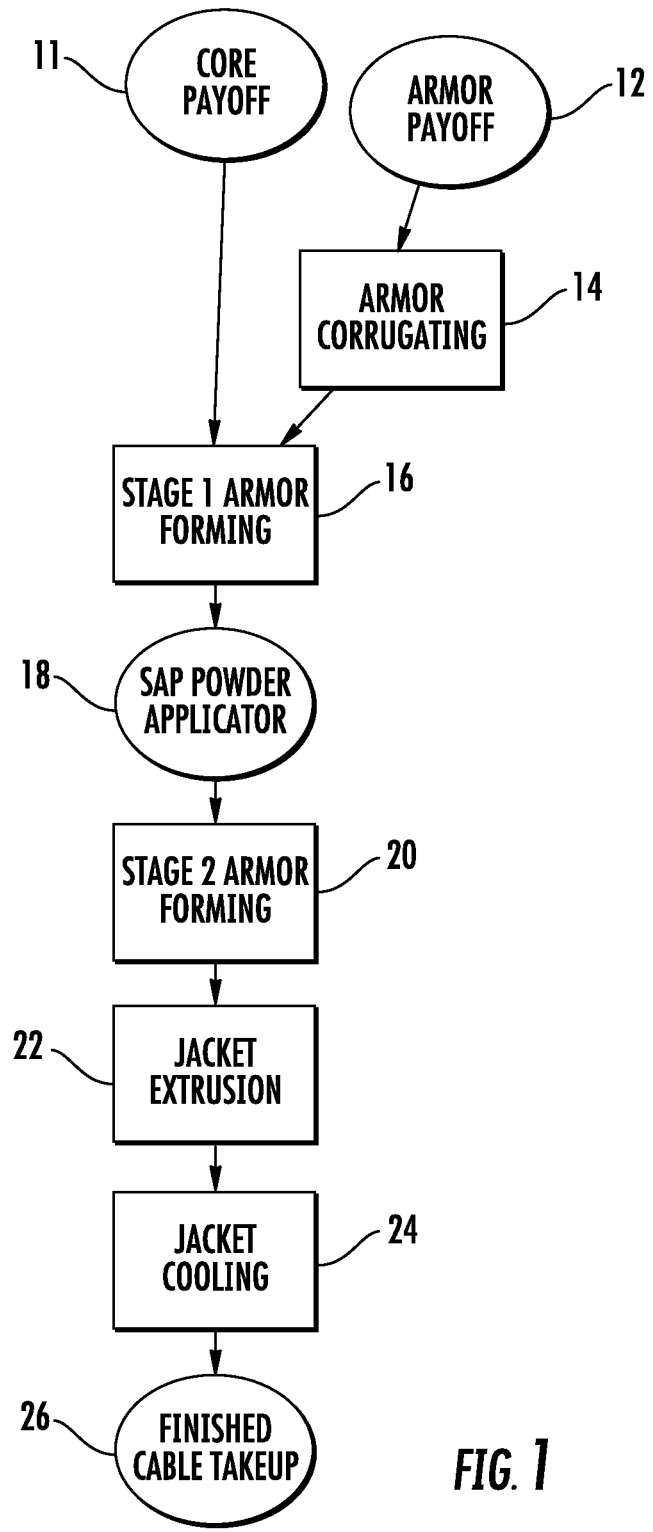
FIG. 1 is process flow diagram showing steps for forming a cable according to an exemplary embodiment.

A process diagram for forming a cable is depicted in FIG. 1. The cable core is provided from a cable core payoff 11. The cable core includes individual buffer tubes, including a plurality of individual optical fibers, and filler rods (if needed) that have been wound around a central support member and secured with a binder. The cable core payoff 11 is, thus, essentially a spool of formed cable core that is fed into the armor forming steps. The armor is provided from an armor payoff 12. The armor is formed from a flat ribbon of spooled armor material, such as steel, aluminum, copper, bronze, and brass, among others. In one embodiment, the armor is corrugated in an armor corrugating step 14. The cable core from the cable core payoff 11 and the armor material from the armor payoff 12 are fed together to a stage one armoring forming step 16. During the stage one armor forming step 16, the armor and the cable core are aligned and placed on the same process stream such that the armor is partially formed around the cable core without fully encompassing the cable core.

In a particular embodiment, while the armor is partially formed around the cable core, SAP powder is applied to the cable by a powder applicator 18. The SAP powder prevents the propagation of water along the cable should the armor be disrupted. After the application of SAP powder, the armor is formed completely around the cable core during a stage two armor forming step 20. A cable jacket is extruded around the armored cable core during a jacket extrusion step 22. The cable is cooled, such as by running the cable through a water trough, during a jacket cooling step 24. Finally, during a finished cable takeup step 26, the cable is spooled, or otherwise collected, for further processing or transport.

The cable forming process described above is a continuous process, i.e., a single run of cable passes continuously through each of these stages in the process. In some instances, more than one hundred kilometers of cable can constitute a single run of cable. Therefore, disruptions to the process, such as for splicing components or for unsticking kinks in the process line, can cause significant delays in cable production.

Figure 2:
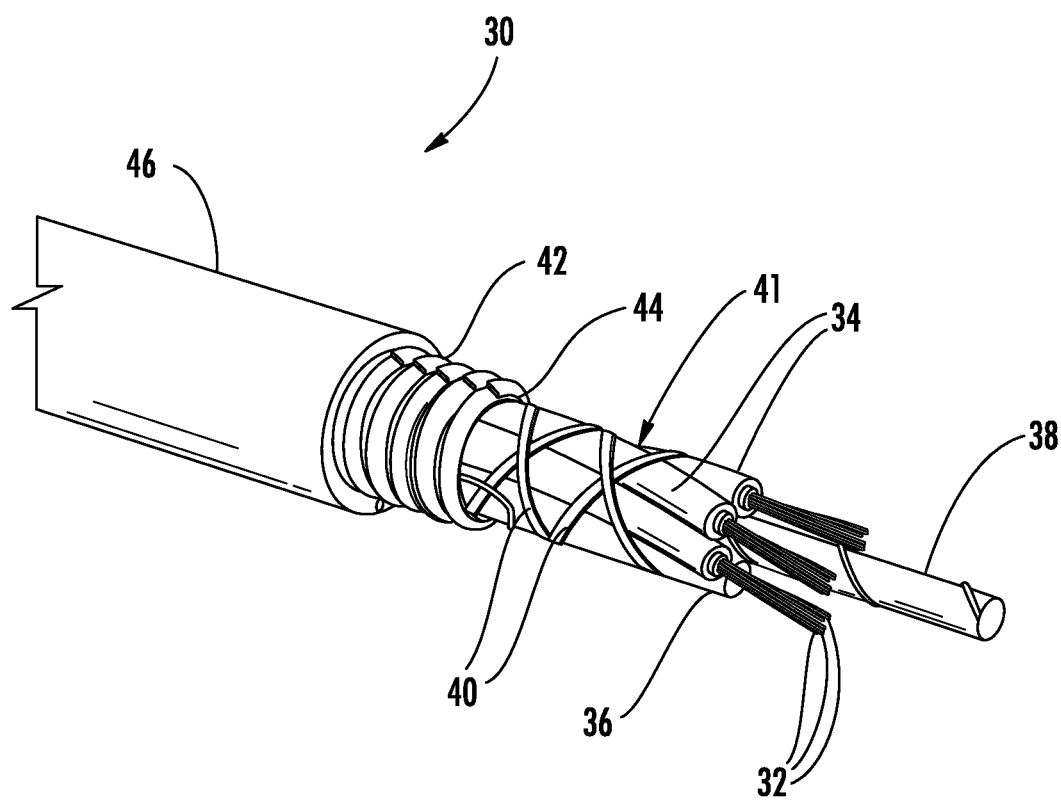
FIG. 2 depicts the components of a cable according to an exemplary embodiment.

FIG. 2 depicts a cable that can be formed according to the processing steps shown in FIG. 1. As can be seen in FIG. 2, the cable 30 features a plurality of optical transmission core elements, and these core elements include bundles of optical fibers 32. The bundles of optical fibers 32 are located within tubes, shown as buffer tubes 34. One or more additional core elements, shown as filler rods 36, may also be included in the cable 30. Filler rods 36 and buffer tubes 34 are arranged around a central support, shown as central strength member 38, which may be formed from a material such as glass-reinforced plastic or metal (e.g., steel). In the embodiment shown, filler rods 36 and buffer tubes 34 are shown in an alternating helical stranding pattern, such as an SZ stranding pattern. Helically wound binders 40 are wrapped around buffer tubes 34 and filler rods 36 to hold these elements in position around central strength member 38. The combination of buffer tubes 34, filler rods 36, central strength member 38, and binder 40 are referred to generally as cable core 41. A reinforcement sheet or layer, shown as armor 42, is wrapped around the cable core 41 of cable 30. In one embodiment, the armor 42 is wrapped around the cable core 41 such that an overlap region 44 is formed. A cable jacket 46 encompasses the armor 42 and the cable core 41.

Armor 42 generally provides an additional layer of protection to the optical fibers 32 within cable 30, and may provide resistance against damage (e.g., damage caused by contact or compression during installation, damage from the elements, damage from rodents, etc.). As can be seen in FIG. 2, the armor 42 is corrugated to provide additional structural reinforcement for the cable 30. In one embodiment, SAP powder is applied to the cable core 41 prior to closing the armor 42 so as to provide an additional level of protection against water, or other fluid, damage.

Because the SAP powder is applied between the cable core 41 and the armor 42, the SAP powder is applied between the two stages of armor forming in one embodiment. In a particular embodiment, the powder applicator 18 is a recirculating powder applicator as shown in FIGS. 3A and 3B.

Figure 3A:
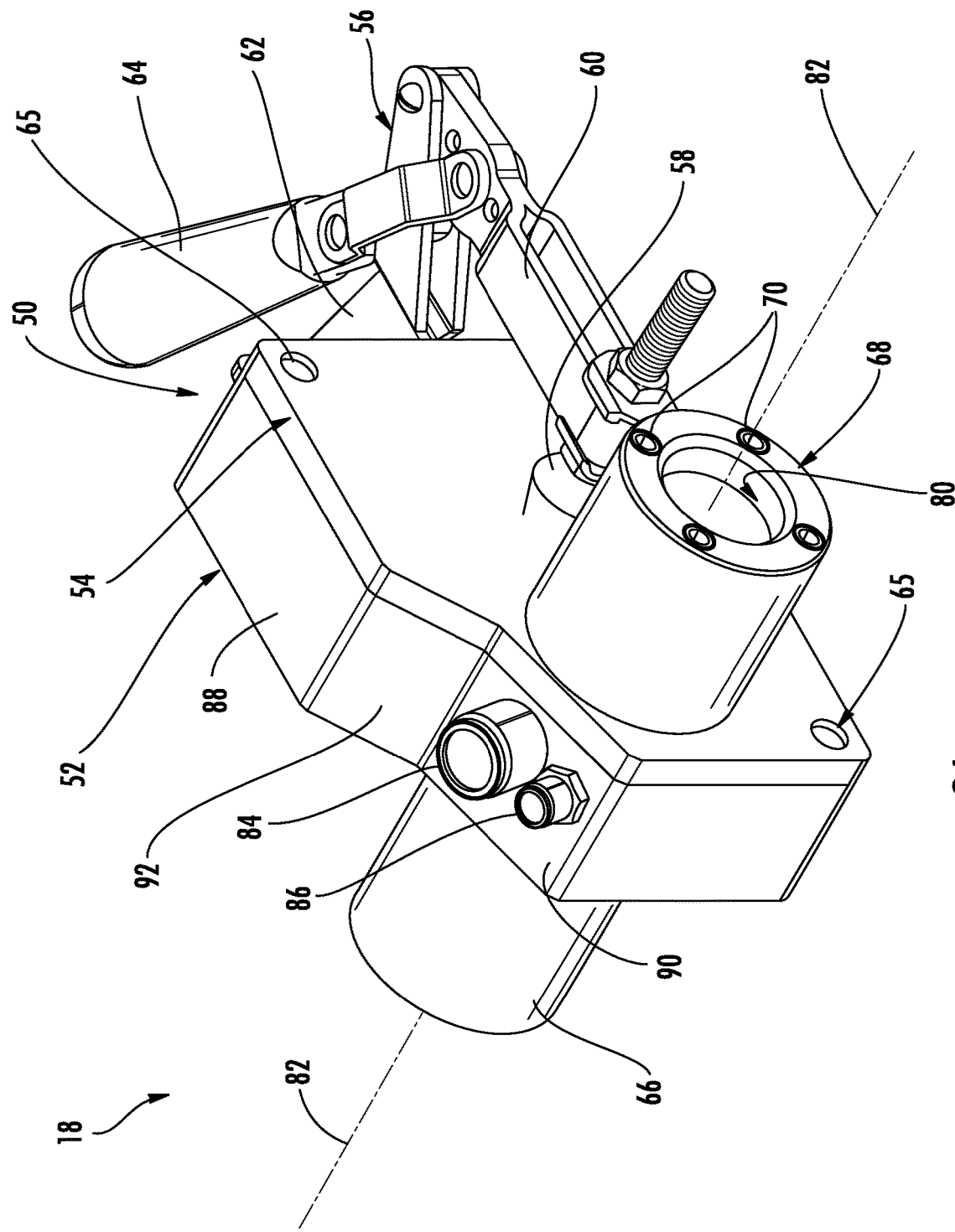
FIG. 3A is an isometric view of the front of a recirculating powder applicator according to an exemplary embodiment.
Figure 3B:
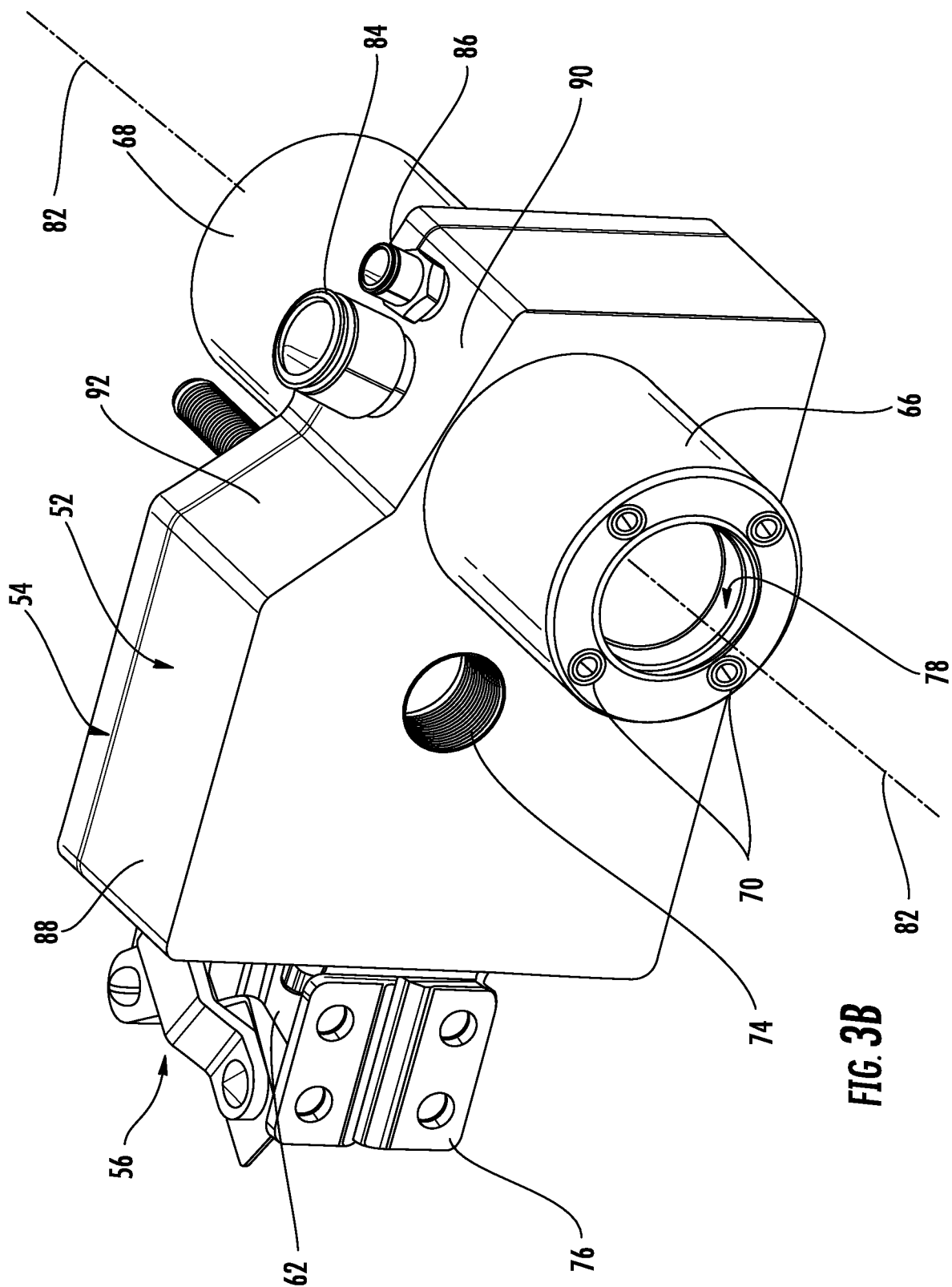
FIG. 3B is an isometric view of the rear of the recirculating powder applicator shown in FIG. 3A according to an exemplary embodiment.

Beginning with FIG. 3A, it can be seen that the recirculating powder applicator 18 has an applicator body 50. The applicator body 50 can be of single body construction, such as a single-body, cast-molded piece. However, in one embodiment shown in FIG. 3A, the applicator body 50 has a two piece construction, including an upstream plate 52 and a downstream plate 54. The two-piece construction allows for access to the interior of the applicator body for a variety of purposes, such as maintenance. The applicator body 50, including the upstream plate 52 and the downstream plate 54, can be machined from a billet of a metal, such as steel, and hardened to resist erosion of the interior surface due to air entrained powder particles.

In a particular embodiment, the upstream plate 52 and downstream plate 54 are reversibly held together using a clamp 56. The clamp 56 generally includes a foot 58 that contacts the downstream plate 54. The foot 58 is attached to a first clamp arm 60. The upstream plate 52 is attached to a second clamp arm 62. The clamp 56 is actuated via a handle 64. In this way, the upstream plate 52 and downstream plate 54 can be reversibly joined such that access to the interior of the applicator body 50 is provided. In another embodiment, alignment means 65 are provided to facilitate assembly of the upstream plate 52 and downstream plate 54 of the applicator body 50. For example, the alignment means 65 can be a pin that mates with matching holes on the upstream plate 52 and downstream plate 54; a pin on one of the plates 52, 54 and a matching hold on the other of the plates 52, 54; or a peripheral ridge on one of the plates 52, 54 and a matching groove on the other of the plates 52, 54.

Provided on the exterior surface of the upstream plate 52 is an inlet 66, and provided on the exterior surface of the downstream plate 54 is an outlet 68. The inlet 66 and outlet 68 can be permanently or reversibly attached to the upstream plate 52 and downstream plate 54. In the exemplary embodiment depicted in FIGS. 3A and 3B, the inlet 66 and outlet 68 are reversibly attached to their respective plates via fasteners 70, which can include such fasteners as screws and pins.

Turning to FIG. 3B, the upstream plate 52 includes an exhaust aperture 74 that provides access to the interior of the applicator body 50. In one embodiment, a mounting plate 76 is also provided on the upstream plate 52. The mounting plate 76 can be used to attach the applicator 18 to a stand or a piece of machinery on the cable processing line.

The inlet 66 includes an opening 78, and the outlet 68 includes an opening 80 (shown in FIG. 3A) that define a passage, shown as line 82, through the applicator body 50. As will be discussed in more detail below, cable core and armor pass through the passage 82 in order for SAP powder to be applied to the cable core and interior surface of the armor. The SAP enters the applicator body 50 through a powder conduit 84 that is located above and that is fluidically connected to the passage 82. Proximal to the powder conduit 84 is an air inlet 86. The air inlet 86 provides air to the interior of the applicator body 50 to circulate the powder within the applicator body 50. In one embodiment, the air inlet 86 is a high pressure nozzle, having a diameter of approximately 0.25 mm. Although described herein as an air inlet, the disclosure herein is not restricted to using air. Other suitable fluids such as nitrogen or carbon dioxide, for example, may be used.

Figures 4, 5:
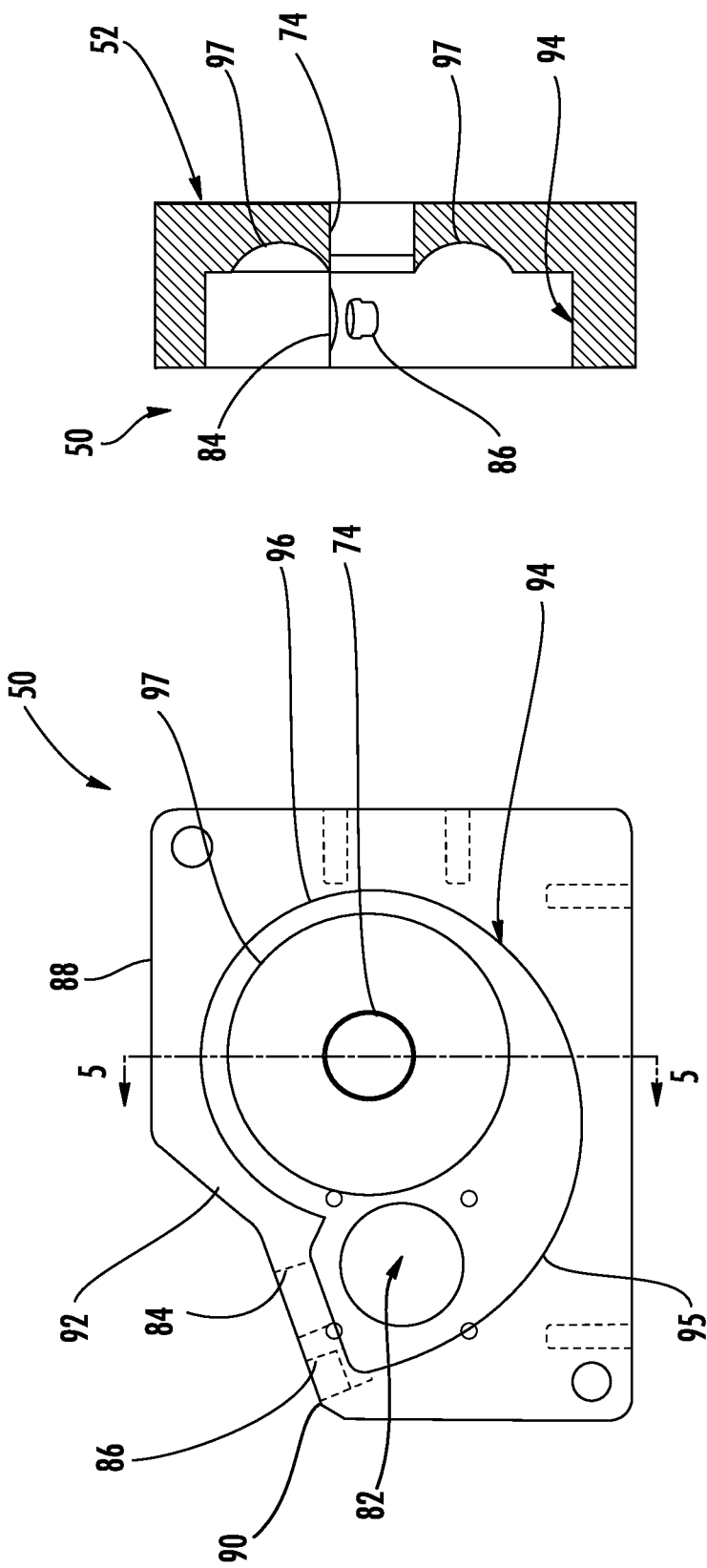
FIG. 4 is a cross-sectional view of the recirculating powder applicator shown in FIGS. 3A and 3B according to an exemplary embodiment.
FIG. 5 is a cross-sectional view of a recirculation region shown in FIG. 4 according to an exemplary embodiment.

In one embodiment, as shown in FIGS. 3A and 3B, the applicator body 50 has a stepped upper surface defined by a first surface 88, a second surface 90, and a transition surface 92. As can be seen in FIG. 4, the stepped surface is provided to accommodate a circulation chamber 94, while maintaining a short path between the powder conduit 84 and the passage 82. In one embodiment, the circulation chamber 94 has an entrance region 95 and a circulation region 96. The entrance region 95 and circulation region 96 define a "nautilus" shape in which the circulation chamber has a curved outer wall with an interior radius of curvature that decreases along the length of the wall. In other embodiments, the circulation chamber 94 can take on other curved shapes, such as a circular shape. The powder conduit 84 and the air inlet 86 are fluidically connected to the entrance region through the second surface 90. Additionally, the passage 82 runs through the entrance region 95 orthogonally to the plane defined by the circulation chamber 94.

The circulation region 96 of the circulation chamber 94 includes a depression 97. In one embodiment, the depression 97 is substantially centered on the exhaust aperture 74. As shown in FIG. 5, in one embodiment, the depression 97 is toroidal in shape. The toroidal shape of the depression 97 enhances the circulating flow of the SAP powder entrained with air and allows the exhaust aperture 74 to extend into the circulation region 96. By extending the exhaust aperture 74 into the circulation region 96, the evacuation of clean air (i.e., air containing only a small fraction of SAP powder) from the applicator 18 is improved. An exhaust hose (not shown) is connected to the exhaust aperture 74 and provides a negative pressure in the circulation chamber 94 such that the clean air can be evacuated. In an embodiment, the circulation chamber 94 and depression are machined into one of the upstream plate 52 and downstream plate 54. In such an embodiment, the other of the upstream plate 52 and downstream plate 54 essentially serves as a lid to cover the applicator body 50.

Figure 6:
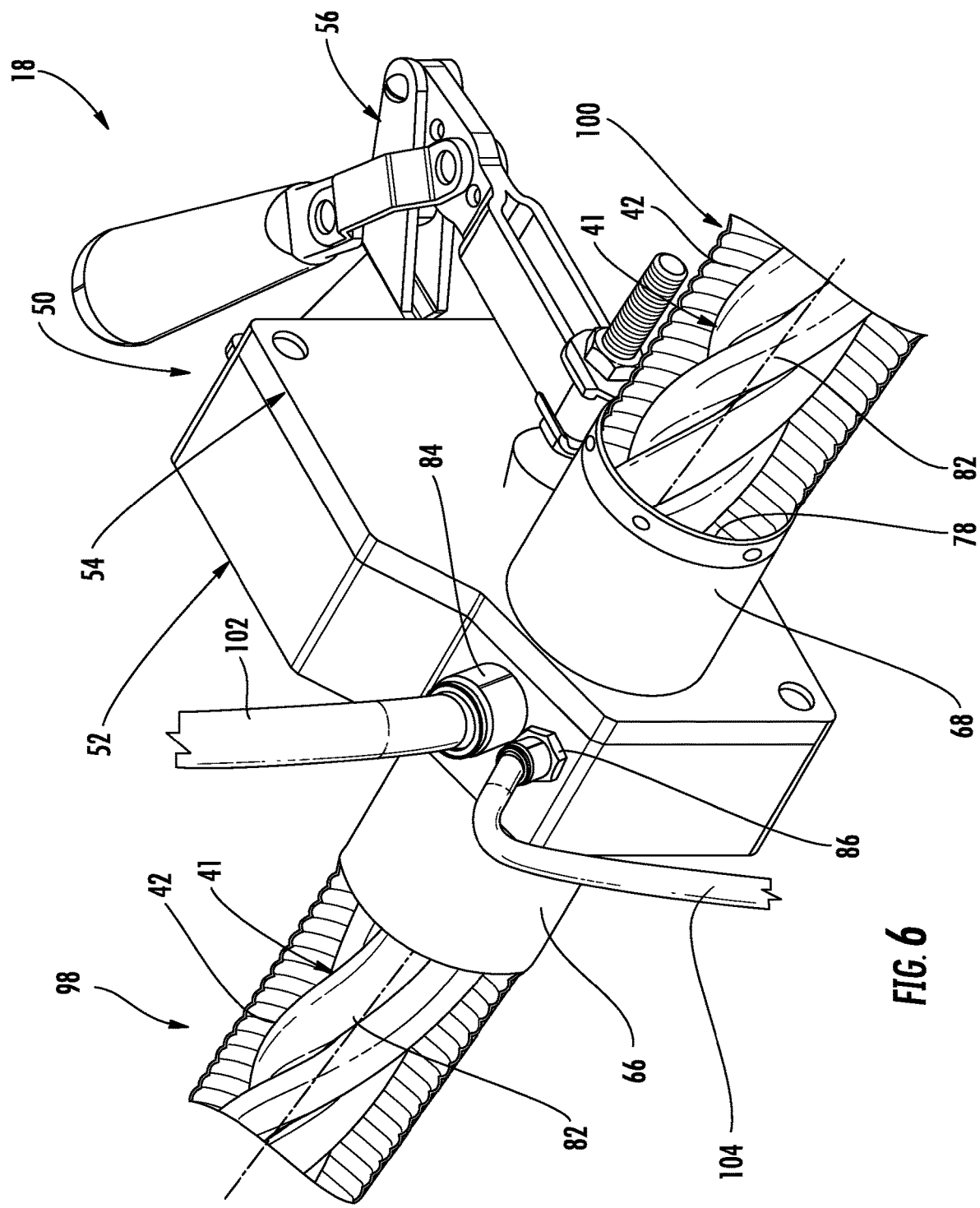
FIG. 6 depicts a recirculating powder applicator as used to apply superabsorbent powder to a cable core according to an exemplary embodiment.

FIG. 6 shows an embodiment of the powder applicator 18 as it would be used to apply powder to a cable core 41 and armor 42. An upstream end 98 of the cable core 41 and armor 42 lines enters the inlet 66 from stage one armor forming 16, traveling along the line of passage 82. The cable core 41 and armor 42 exit the applicator body 18 through the outlet 68 of the downstream plate 54. A downstream end 100 of the cable core 41 and armor 42 travels to stage two armor forming 20.

While passing through the applicator 18, the cable core 41 and armor 42 are coated with SAP powder. The SAP powder is provided via a powder supply line 102 connected to the powder conduit 84. The powder travels to the powder applicator 18 along the powder supply line 102 from a powder storage compartment. The storage compartment can be, for example, a volumetric feeder, a gravimetric feeder, dry cabinet, or a hopper. Controls for metering the powder can be provided with the storage compartment, on the powder supply line 102, or at the powder conduit 84. The metered flow of powder drops onto the cable core 41 and the interior surface of the armor 42. The impact of which causes mechanical separation of the powder particles.

Air flows into the powder applicator 18 via an air supply line 104 connected to the air inlet 86. The air is provided at a pressure between 15 and 100 psi to the air inlet 86 in order to create a high velocity, low volume jet that causes the mechanically separated particles to disperse and sends the particles on a circular flow path in the circulation chamber 94. The jet of air flows through the entrance region 95 and sweeps the bottom of the circulation region 96 clear of powder particles and creates cyclonic circulation within the circulation chamber 94. The powder is denser than the air, and thus, the cyclonic action causes the powder particles to travel along to the outer periphery of the circulation chamber 94. The break in the outer periphery in the region defining the transition between the entrance region 95 and the circulation region 96 causes the particles to leave the outer periphery at high velocity to be deposited on the moving cable core 41 and armor 42. Thus, under the influence of the air stream, the particles circulate around the circulation chamber until they return to the cable core 41 and armor 42. The jet of air within the circulation chamber also prevents the buildup of powder particles through the sweeping action mentioned above, which ensures that the total dwell time of powder within the powder applicator 18 is low. Accordingly, moisture in the air is not able to cause the SAP powder to clump.

Advantageously, the powder is applied only to the cable core 41 and inside surface of the armor 42. The powder sticks to the cable core 41 as a result of Van der Waals forces. In some embodiments, the inside surface of the armor 42 is oiled from corrugation step 14 or the stage one armor forming step 16, and the oil helps the SAP to stick to the armor 42. In the stage two armor forming step 20, the forming elements do not contact the inside surface of the armor 42, which might otherwise disrupt the uniform coating of the powder on the inside surface.

Using the above-described process, at least 95% of the powder that enters the powder applicator 18 is deposited on the cable core 41 and armor 42. Of the at least 95% of the deposited powder, a first portion of the powder is deposited directly onto the cable core 41 and armor 42 from the powder conduit 84. A second portion of the powder is circulated in the circulation chamber 94 before being deposited on the cable core 41 and armor 42. The remaining portion of the powder, which is, at most, approximately 5% of the powder, is exhausted through the exhaust aperture 74.

The powder is provided to the powder conduit 86 at a metered rate, such as, for example, approximately five grams per meter of cable core. This allows for precise control of the deposition rate over a wide range of production line speeds. Additionally, during application of the powder, equilibrium between the first portion of powder deposited directly onto the cable core 41 and armor 42, the second portion of powder circulated within the circulation chamber 94, and the powder contained in the exhaust gas will be achieved. Thus, a constant, metered, and controlled flow of powder can be maintained to provide a uniform distribution of powder onto the surface of the cable core 41 and armor 42 without concern of powder buildup within the powder applicator 18, which could cause clogging of the powder applicator or clumps to form between the cable core and the armor.

Application of the SAP directly to the cable in the form of a powder provides a material cost savings and a weight savings. Additionally, because a high percentage (between 95-97%) of the SAP is applied to the cable, there is no need to recycle the circulated powder. Recycling the powder can lead to clogging of machinery or deposition of clumps because the powder that has been exposed to the air will absorb moisture from the air. Because of the long processing times for cable runs of longer than one hundred kilometers, it is imperative to avoid an accumulation of SAP powder on the processing equipment because a single clump could create a bulge in the cable, which could upset the cable processing line.

Also advantageously, the powder applicator 18 can be made very compact. In one embodiment, the powder applicator is approximately 142 mm long and has only three required connections: one powder supply line 102, one air supply line 104, and one exhaust hose (not shown). This design allows the powder applicator to be placed in tandem between armor forming elements.

In another embodiment of the powder applicator 18 shown in FIGS. 7-10, the inlet 66 and outlet 68 are designed to provide additional protection against the escape of powder during application. FIGS. 7-10 represent both an inlet 66 and an outlet 68. Accordingly, the modifications in the following discussions are equally applicable to both the inlet 66 and the outlet 68. However, for ease of reference, only the inlet 66 will be referred to in terms of the modifications.

Figure 7:
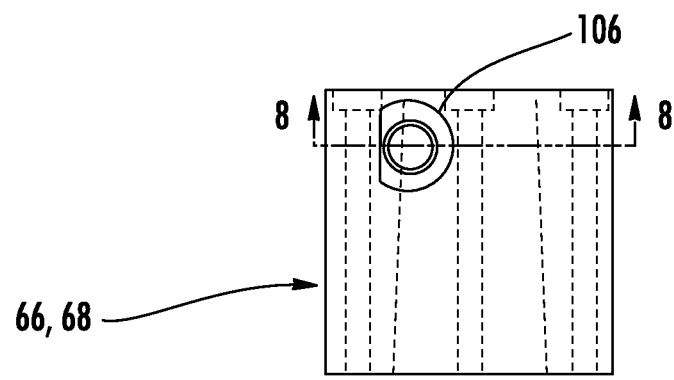
FIG. 7 is another embodiment of the recirculating powder applicator inlet/outlet according to another exemplary embodiment.
Figure 8:
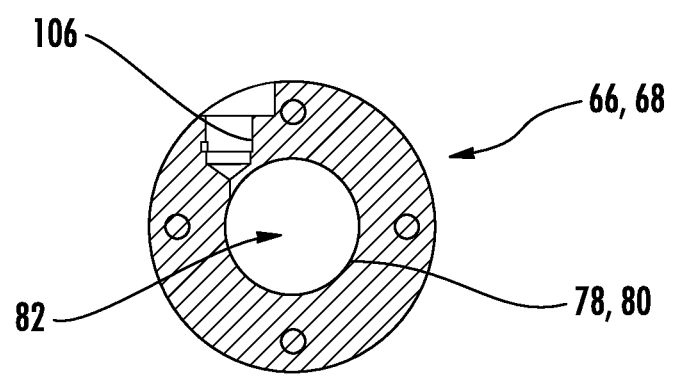
FIG. 8 is a cross-sectional view of the inlet/outlet of FIG. 7 according to an exemplary embodiment.

As can be seen in FIG. 7, the inlet 66 features an air nozzle 106. The air nozzle 106 can be located anywhere along the length of the inlet 66, but as shown in FIG. 7, the air nozzle 106 is located towards the upstream end of the inlet (i.e., the end furthest away from the applicator body 18). FIG. 8 shows a cross-section of the air nozzle 106. As can be seen in FIG. 8, the air nozzle 106 is in fluid communication with the passage 82. In an embodiment, the air nozzle 106 is provided with pressurized air that directs any powder particles that might enter the inlet 66 back into the circulation chamber 94.

Figure 9:
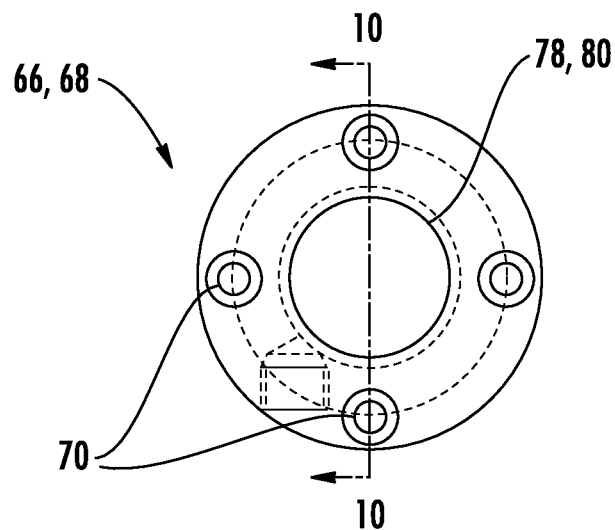
FIG. 9 is a plan view of the inlet/outlet of FIG. 7 according to an exemplary embodiment.
Figure 10:
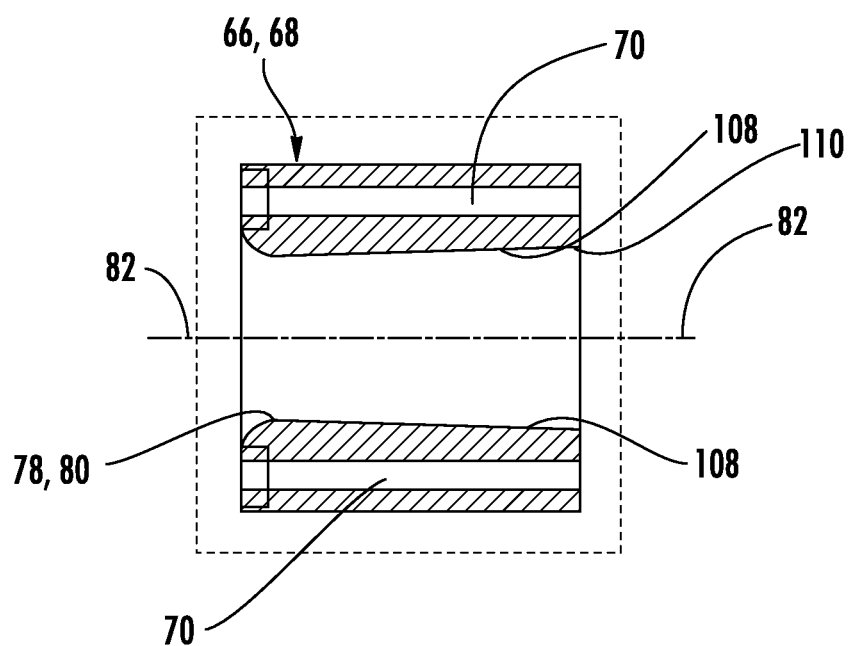
FIG. 10 is a cross-sectional view of the inlet/outlet of FIG. 9 according to an exemplary embodiment.

FIG. 9 depicts a plan view of the front of the inlet 66. FIG. 10 is a cross-section of FIG. 9. As can be seen in FIG. 10, the inlet 66 has an interior surface 108 that is tapered. The interior surface 108 is tapered from the relatively smaller opening 78 to a relatively larger applicator body side opening 110. In an embodiment, the taper produces a surface that is angled between 1 and 10°. In a particular embodiment, the taper creates a surface that is angled at about 4°. The tapered interior surface 108 encourages any particles that enter the inlet to travel back into the circulation chamber 94.

The tapered interior surface 108 and the air nozzle 106 can be used in conjunction or separately. Additionally, the inlet 66 and outlet 68 can both feature the air nozzle 106 and the tapered surface 108, or the inlet 66 and outlet 68 can feature either the air nozzle 106 or the tapered surface 108. Moreover, the inlet 66 and outlet 68 do not have to match.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A method of applying powder to a substrate during a continuous process, the method comprising the steps of:
   providing a continuous run of a substrate through a powder applicator;
   providing a metered flow of powder onto the substrate through a powder conduit of the powder applicator, wherein a first portion of the powder is deposited on the substrate from the powder conduit;
   providing between 15 and 100 psi of air through an air inlet of the powder applicator simultaneously with the providing the metered flow of the powder, wherein the air recirculates a second portion of the powder within a circulation chamber of the powder applicator and wherein the second portion of powder is deposited on the substrate after being recirculated; and
   exhausting the air through an exhaust aperture located within the circulation chamber of the powder applicator, wherein the exhausted air contains less than 5% of the powder dispersed within the air.

2. The method of claim 1, further comprising the step of achieving equilibrium between the first portion of deposited powder, the second portion of recirculated powder, and the powder in the exhausted air, such that the first and second portions of powder and the powder in the exhausted gas equal the metered flow of powder on the substrate.

3. The method of claim 1, wherein the circulation chamber is shaped like a nautilus.

4. The method of claim 1, wherein the circulation chamber includes a depression around the exhaust aperture.

5. The method of claim 4, wherein the depression is toroidal in shape.

6. The method of claim 1, wherein the powder is a superabsorbent polymer.

7. The method of claim 6, wherein the substrate is a run of cable core and partially formed armor.

8. A method of applying a moisture barrier between a cable core and an armor, the method comprising the steps of:
   receiving a run of cable core from a cable core payoff;
   receiving a run of armor from an armor payoff;
   forming the armor at least partially around the cable core during a first armor forming step;
   applying a superabsorbent powder to the cable core and an interior surface of the partially formed armor, wherein the powder is applied using a powder applicator that comprises:
      an applicator body including an inlet on an upstream surface and an outlet on a downstream surface, wherein the inlet and outlet define a passage that extends transversely through the thickness of the applicator body;
      a powder conduit;
      an air inlet;

an exhaust aperture located on one of the upstream or downstream surfaces; and a circulation chamber located on the interior of the applicator body and including a depression formed around the exhaust aperture;

wherein the powder conduit and air inlet are in fluid communication with the passage and wherein the passage is in fluid communication with the circulation chamber; and completing the forming of the armor around the cable core during a second armor forming step such that the armor surrounds the cable core.

9. The method of claim 8, further comprising the step of extruding a jacket around the armor.

10. The method of claim 8, wherein the cable core contains a plurality of bundles of optical fiber elements.

11. The method of claim 8, wherein the applying a superabsorbent powder step further comprises the steps of:

providing a metered flow of powder onto the cable core and armor through a powder conduit of the powder applicator, wherein a first portion of the powder is deposited on the cable core and armor from the powder conduit;

providing between 15 and 100 psi of a gas through an air inlet of the powder applicator simultaneously with the providing a metered flow of powder step, wherein the gas recirculates a second portion of the powder within the circulation chamber of the powder applicator and wherein the second portion of powder is deposited on the cable core and armor after being recirculated; and exhausting the gas through an exhaust aperture located within the circulation chamber of the powder applicator, wherein the exhausted gas contains less than 5% of the powder dispersed within the gas.

12. The method of claim 11, further comprising the step of achieving equilibrium between the first portion of deposited powder, the second portion of recirculated powder, and the powder in the exhausted gas, such that the first and second portions of powder and the powder in the exhausted gas equal the metered flow of powder on the substrate.

\* \* \* \* \*